US011722277B2

(12) United States Patent
Son et al.

(10) Patent No.: US 11,722,277 B2
(45) Date of Patent: *Aug. 8, 2023

(54) WIRELESS COMMUNICATION METHOD AND WIRELESS COMMUNICATION TERMINAL USING TRAINING SIGNAL

(71) Applicants: WILUS INSTITUTE OF STANDARDS AND TECHNOLOGY INC., Gyeonggi-do (KR); SK TELECOM CO., LTD., Seoul (KR)

(72) Inventors: Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,348

(22) Filed: Feb. 11, 2022

(65) Prior Publication Data
US 2022/0166579 A1 May 26, 2022

Related U.S. Application Data

(63) Continuation of application No. 16/844,817, filed on Apr. 9, 2020, now Pat. No. 11,283,570, which is a (Continued)

(30) Foreign Application Priority Data

Apr. 20, 2015 (KR) .................. 10-2015-0055563
May 4, 2015 (KR) .................. 10-2015-0062726

(51) Int. Cl.
*H04L 5/00* (2006.01)
*H04W 72/04* (2023.01)
(Continued)

(52) U.S. Cl.
CPC .............. *H04L 5/0048* (2013.01); *H04L 5/00* (2013.01); *H04L 5/0053* (2013.01); *H04L 27/26* (2013.01);
(Continued)

(58) Field of Classification Search
CPC .......... H04L 5/00; H04L 27/26; H04W 72/04
See application file for complete search history.

(56) References Cited

U.S. PATENT DOCUMENTS 7,327,817 B2  2/2008 Wenger et al.
2010/0284393 A1  11/2010 Abraham et al.
(Continued)

FOREIGN PATENT DOCUMENTS

CN  102104574  6/2011
CN  102598762  7/2012
(Continued)

OTHER PUBLICATIONS

Notice of Allowance dated May 13, 2022 for Korean Patent Application No. 10-2022-7005101 and its English translation provided by Applicant's foreign counsel.
(Continued)

Primary Examiner — Kent Krueger
(74) Attorney, Agent, or Firm — Ladas & Parry, LLP

(57) ABSTRACT

A wireless communication terminal is disclosed. The wireless communication terminal includes a transceiver configured to transmit/receive a wireless signal; and a processor configured to control an operation of the wireless communication terminal. The transceiver transmits a training signal to a base wireless communication terminal based on a sub-frequency band allocated from the base wireless communication terminal, and transmits data to the base wireless communication terminal through the sub-frequency band allocated from the base wireless communication terminal.

(Continued)

The training signal is used, by the base wireless communication terminal, for receiving the data from the wireless communication terminal.

6 Claims, 16 Drawing Sheets

Related U.S. Application Data continuation of application No. 15/719,547, filed on Sep. 29, 2017, now Pat. No. 10,666,405, which is a continuation of application No. PCT/KR2016/004131, filed on Apr. 20, 2016.

(51) Int. Cl.
*H04L 27/26* (2006.01)
*H04W 72/0446* (2023.01)
*H04W 72/0453* (2023.01)

(52) U.S. Cl.
CPC ..... *H04L 27/2613* (2013.01); *H04W 72/0446* (2013.01); *H04W 72/0453* (2013.01); *H04L 27/26132* (2021.01)

(56) References Cited

U.S. PATENT DOCUMENTS

| | | | |
|---|---|---|---|
| 2011/0003553 | A1 | 1/2011 | Kim et al. |
| 2012/0263141 | A1 | 10/2012 | Taghavi Nasrabadi et al. |
| 2013/0230120 | A1 | 9/2013 | Yang et al. |
| 2014/0211775 | A1 | 7/2014 | Sampath et al. |
| 2015/0063255 | A1 | 3/2015 | Tandra et al. |
| 2015/0146653 | A1 | 5/2015 | Zhang et al. |
| 2015/0334708 | A1 | 11/2015 | Lee et al. |
| 2018/0026767 | A1 | 1/2018 | Son et al. |
| 2020/0235883 | A1 | 7/2020 | Son et al. |

FOREIGN PATENT DOCUMENTS

| | | |
|---|---|---|
| CN | 102714815 | 10/2012 |
| CN | 102959918 | 3/2013 |
| CN | 103905349 | 7/2014 |
| CN | 104205701 | 12/2014 |
| KR | 10-2006-0132785 | 12/2006 |
| WO | 2014/182065 | 11/2014 |
| WO | 2016/171475 | 10/2016 |

OTHER PUBLICATIONS

Office Action dated Apr. 12, 2021 for Chinese Patent Application No. 201680022741.7 and its English translation provided by Applicant's foreign counsel.
International Search Report for PCT/KR2016/004131 dated Aug. 4, 2016 and its English translation from WIPO (published as WO 2016/171475).
Written Opinion of the International Searching Authority for PCT/KR2016/004131 dated Aug. 4, 2016 and its English translation from WIPO (published as WO 2016/171475).
International Preliminary Report on Patentability (Chapter I) dated Oct. 24, 2017 for PCT/KR2016/004131 and its English translation from WIPO (now published as WO 2016/171475)
Office Action dated Apr. 1, 2020 for Korean Patent Application No. 10-2017-7027443 and its English translation provided by Applicant's foreign counsel.
Woojin Ahn et al., "Bandwidth granularity on UL-OFDMA data allocation", IEEE 802.11-15/0354r1, Mar. 11, 2015. Slides 1-15.
Yakun Sun et al. "HE-STF Proposal", IEEE 802.11-15/0381r0, Mar. 9, 2015. Slides 1-38.
Notice of Allowance dated Jan. 10, 2020 for U.S. Appl. No. 15/719,547 (now published as US 2018/0026767).
Non-Final Office Action dated Sep. 4, 2019 for U.S. Appl. No. 15/719,547 (now published as US 2018/0026767).
Final Office Action dated May 2, 2019 for U.S. Appl. No. 15/719,547 (now published as US 2018/0026767)
Non-Final Office Action dated Jan. 7, 2019 for U.S. Appl. No. 15/719,547 (now published as US 2018/0026767).
Office Action dated Jul. 13, 2020 for Indian Patent Application No. 201737034378.
Office Action dated Aug. 4, 2020 for Korean Patent Application No. 10-2017-7027443 and its English translation provided by Applicant's foreign counsel.
Office Action dated Aug. 21, 2020 for Chinese Patent Application No. 2016800227417 and its English translation provided by Applicant's foreign counsel.
3GPP TSG-RAN WG4 Meeting #72, Dresden Germany, Aug. 18-22, 2014, R4-145052: "Further discussion on signalling of scaling factor value", pp. 1-8.
Office Action dated May 28, 2021 for Korean Patent Application No. 10-2021-7007570 and its English translation provided by Applicant's foreign counsel.
LAN/MAN Standards Committee: IEEE Standard for Information technology—Telecommunications and information exchange between systems Local and metropolitan area networks—Specific requirements: "Part 11: Wireless LAN Medium Access Control (MAC) and Physical Layer (PHY) Specifications", IEEE Std 802.11™—2012 (Revision of IEEE Std 802.11-2007), New York, NY, USA, Mar. 29, 2012.
Office Action dated Jul. 22, 2021 for U.S. Appl. No. 16/844,807.
Notice of Allowance dated Sep. 18, 2021 for Chinese Patent Application No. 201680022741.7 and its English translation provided by the Applicant's foreign counsel.
Notice of Allowance dated Nov. 16, 2021 for U.S. Appl. No. 16/844,807.
Notice of Allowance dated Nov. 22, 2021 for Korean Patent Application No. 10-2021-7007570 and its English translation provided by the Applicant's foreign counsel.
Reza Hedayat et al.: "Uplink MU Transmission and Coexistence", IEEE 802.11-15/86r2, Jan. 12, 2015. Slides 1-12.
Notice of Allowance dated Nov. 12, 2021 for U.S. Appl. No. 16/844,817 (now published as US 2020/0235883).
Corrected Notice of Allowance dated Dec. 22, 2021 for U.S. Appl. No. 16/844,817 (now published as US 2020/0235883).
Office Action dated Jul. 22, 2021 for U.S. Appl. No. 16/844,817 (now published as US 2020/0235883).
Office Action dated May 15, 2023 for Korean Patent Application No. 10-2022-7027971 and its English translation provided by Applicant's foreign counsel.

WIRELESS COMMUNICATION METHOD AND WIRELESS COMMUNICATION TERMINAL USING TRAINING SIGNAL

CROSS-REFERENCE TO RELATED APPLICATIONS

This application is a continuation of U.S. patent application Ser. No. 16/844,817 filed on Apr. 9, 2020, which is a continuation of U.S. patent application Ser. No. 15/719,547 filed on Sep. 29, 2017, issued as U.S. Pat. No. 10,666,405 on May 26, 2020, which is a continuation of International Patent Application No. PCT/KR2016/004131 filed on Apr. 20, 2016, which claims the priority to Korean Patent Application No. 10-2015-0055563 filed in the Korean Intellectual Property Office on Apr. 20, 2015, and Korean Patent Application No. 10-2015-0062726 filed in the Korean Intellectual Property Office on May 4, 2015, the entire contents of which are incorporated herein by reference.

TECHNICAL FIELD

The present invention relates to a wireless communication method and a wireless communication terminal for setting a broadband link. Specifically, the present invention relates to a wireless communication method and a wireless communication terminal for delivering an efficient training signal for simultaneous communication with a plurality of terminals.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An object of the present invention is to provide an efficient wireless communication method and wireless communication terminal.

Especially, an object of the present invention is to provide a wireless communication method and wireless communication terminal using a training signal.

Technical Solution

According to an embodiment of the present invention, a wireless communication terminal includes: a transceiver configured to transmit/receive a wireless signal; and a processor configured to control an operation of the wireless communication terminal, wherein the transceiver transmits a training signal to a base wireless communication terminal based on a sub-frequency band allocated from the base wireless communication terminal, and transmits data to the base wireless communication terminal through the sub-frequency band allocated from the base wireless communication terminal, wherein the training signal is used, by the base wireless communication terminal, for receiving the data from the wireless communication terminal.

The transceiver may transmit a subcarrier of the training signal corresponding to the sub-frequency band which is allocated to the wireless communication terminal by the base wireless communication terminal.

The transceiver may apply a training signal scaling value for adjusting a magnitude of the training signal when transmitting the subcarrier.

The transceiver may determine the training signal scaling value based on the number of subcarriers of the training signal corresponding to the sub-frequency band which is allocated to the wireless communication terminal by the base wireless communication terminal.

The transceiver may determine the training signal scaling value based on the number of entire subcarriers corresponding to the sub-frequency band which is allocated to the wireless communication terminal by the base wireless communication terminal; and the number of entire subcarriers may indicate the number of subcarriers used to transmit data through the sub-frequency band which is allocated to the wireless communication terminal by the base wireless communication terminal.

The transceiver may determine the training signal scaling value based on a value obtained by dividing the number of subcarriers of the training signal corresponding to the sub-frequency band which is allocated to the wireless communication terminal by the base wireless communication terminal by the number of entire subcarriers.

The subcarrier used to transmit data through the sub-frequency band which is allocated to the wireless communication terminal by the base wireless communication terminal may include a subcarrier for transmitting data and a subcarrier for transmitting a pilot signal.

The transceiver may transmit an additional subcarrier that corresponds to a sub-frequency band adjacent to the sub-frequency band allocated from the base wireless communication terminal and does not correspond to the sub-frequency band which is allocated to the plurality of wireless communication terminals.

The transceiver and another wireless communication terminal may transmit the additional subcarrier at the same time.

The transceiver may receive signaling information on a method of transmitting the additional subcarrier and transmit the additional subcarrier based on the signaling information.

The signaling information may be in a signaling field for signaling information on each of the plurality of wireless communication terminals.

The signaling information may indicate a wireless communication terminal that is to transmit the additional subcarrier.

The signaling information may be applied when the additional subcarrier is transmitted to indicate a scaling value for adjusting the magnitude of the additional subcarrier.

According to an embodiment of the present invention, a base wireless communication terminal includes: a transceiver configured to transmit/receive a wireless signal; and a processor configured to control an operation of the wireless communication terminal, wherein the transceiver allocates a plurality of sub-frequency bands to a plurality of wireless communication terminals, receives a training signal from each of the plurality of wireless communication terminals based on the plurality of sub-frequency bands allocated to each of the plurality of wireless communication terminals, and receives the data from each of the plurality of wireless communication terminals based on the training signal through the plurality of sub-frequency bands allocated to each of the plurality of wireless communication terminals.

Each of the plurality of wireless communication terminals may transmit a subcarrier of the training signal corresponding to the sub-frequency band which is allocated to each of the plurality of wireless communication terminals by the base wireless communication terminal.

At least one of the plurality of wireless communication terminals may be allocated a sub-frequency band adjacent to the sub-frequency band allocated from the base wireless communication terminal and transmit an additional subcarrier that does not correspond to the sub-frequency band which is allocated to the plurality of wireless communication terminals.

The transceiver may transmit signaling information on a method of transmitting the additional subcarrier.

The signaling information may indicate a wireless communication terminal that is to transmit the additional subcarrier.

The signaling information may be applied when the additional subcarrier is transmitted to indicate a scaling value for adjusting the magnitude of the additional subcarrier.

According to an embodiment of the present invention, an operating method of a wireless communication terminal includes: transmitting a training signal to a base wireless communication terminal based on a sub-frequency band allocated from the base wireless communication terminal; and transmitting data to the base wireless communication terminal through the sub-frequency band allocated from the base wireless communication terminal, wherein the training signal is used, by the base wireless communication terminal, for receiving the data from the wireless communication terminal.

Advantageous Effects

One embodiment of the present invention provides an efficient wireless communication method and wireless communication terminal.

Especially, an embodiment of the present invention provides a wireless communication method and wireless communication terminal using a training signal efficiently.

MODE FOR CARRYING OUT THE INVENTION

Figure 1:
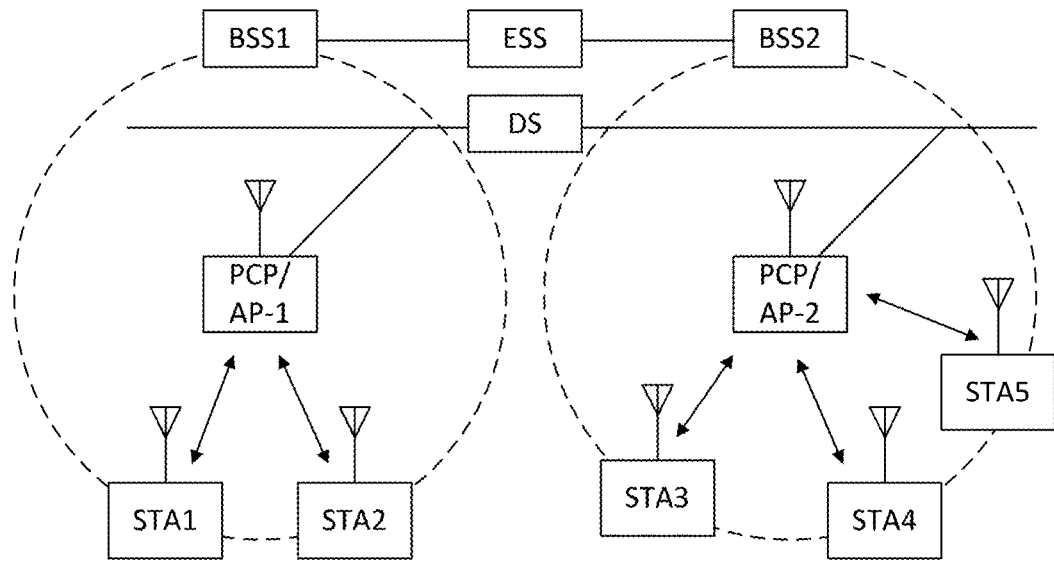
FIG. 1 is a view illustrating a wireless communication system according to an embodiment of the present invention.

Preferred embodiments of the present invention will be described below in more detail with reference to the accompanying drawings. The present invention may, however, be embodied in different forms and should not be construed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2015-0055563, and Nos. 10-2105-0062726 filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA_d, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
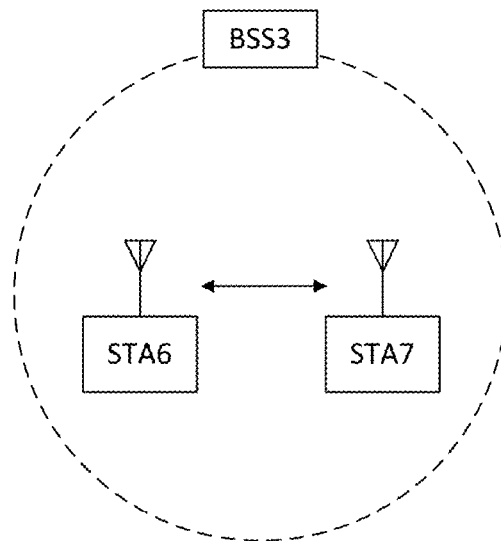
FIG. 2 is a view illustrating a wireless communication system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
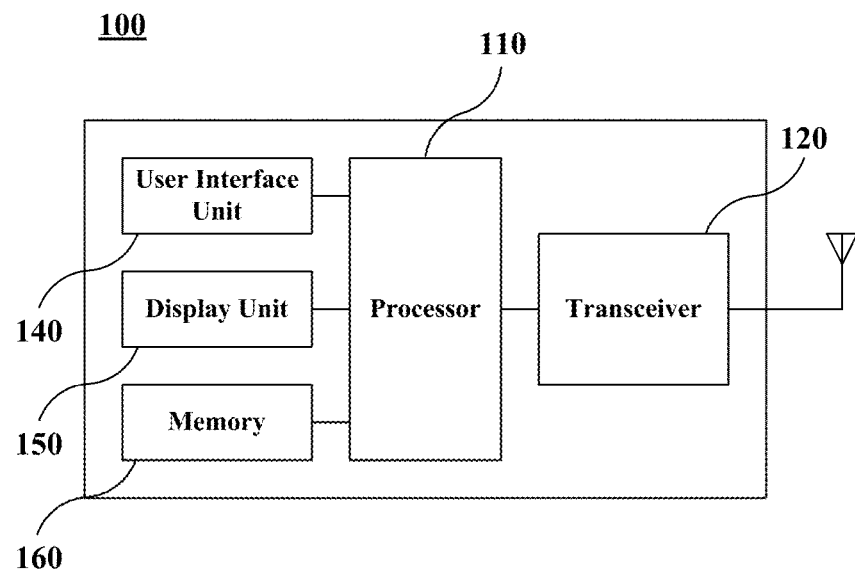
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
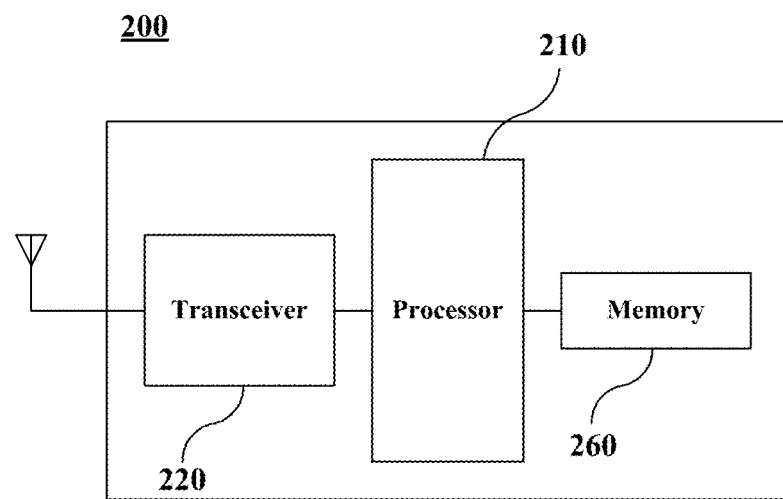
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
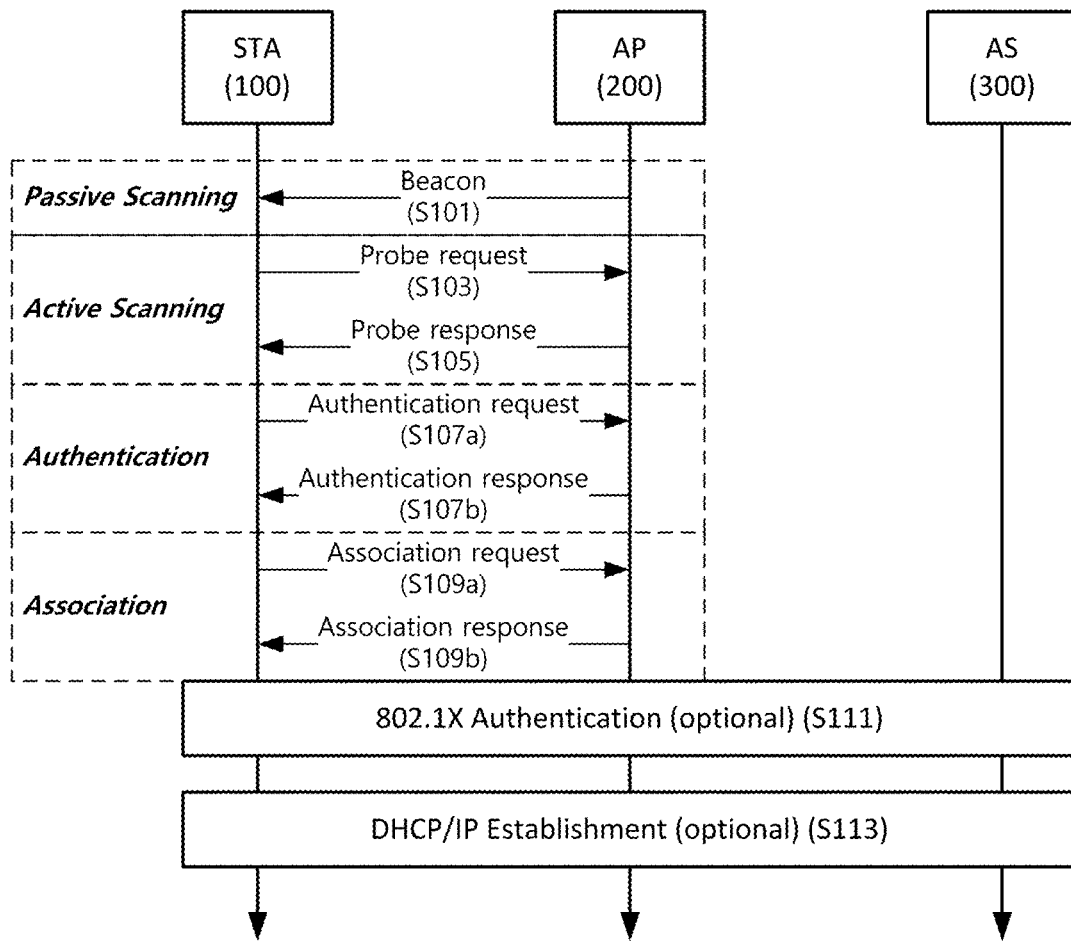
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using Orthogonal Frequency Division Modulation (OFDMA) or Multi Input Multi Output (MIMO), any one wireless communication terminal may transmit data to a plurality of wireless communication terminals simultaneously. Also, any one wireless communication terminal may simultaneously receive data from a plurality of wireless communication terminals.

For convenience of description, any one wireless communication terminal that communicates simultaneously with a plurality of wireless communication terminals is referred to as a first wireless communication terminal and a plurality of wireless communication terminals that simultaneously communicate with the first wireless communication terminal are referred to as a plurality of second wireless communication terminals. In addition, the first wireless communication terminal may be referred to as a base wireless communication terminal. In addition, the first wireless communication terminal may be a wireless communication terminal that allocates a communication medium resource and performs scheduling in communication with a plurality of wireless communication terminals. Specifically, the first wireless communication terminal may perform the role of a cell coordinator. At this time, the first wireless communication terminal may be the access point 200. In addition, the second wireless communication terminal may be the station 100 associated with the access point 200. In a specific embodiment, the first wireless communication terminal may be a wireless communication terminal that allocates a communication medium resource and performs scheduling in an independent network, such as an ad-hoc network, which is not connected to an external distribution service. In addition, the first wireless communication terminal may be at least one of a base station, an eNB, and a transmission point TP.

Through FIGS. 6 to 18, a method in which a first wireless communication terminal and a plurality of second wireless communication terminals communicate with each other will be described. Specifically, a method of using a training signal when a first wireless communication terminal and a plurality of second wireless communication terminals communicate with each other will be described.

Figure 6:
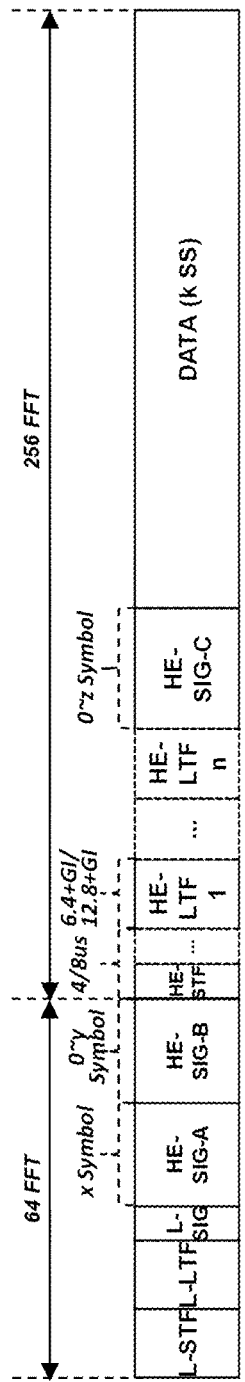
FIG. 6 is a view illustrating a format of a physical frame according to an embodiment of the present invention.

FIG. 6 is a view illustrating a format of a physical frame according to an embodiment of the present invention.

The physical frame transmitted by a wireless communication terminal according to an embodiment of the present invention includes a legacy preamble for signaling information for a wireless communication terminal that does not support an embodiment of the present invention, a non-legacy preamble for signaling information for a wireless communication terminal that supports an embodiment of the present invention, and a data frame for transmitting data.

The legacy preamble may include at least part of information un-decodable by a wireless communication terminal that does not support an embodiment of the present invention. The legacy preamble may include an L-STF field, an L-LTF field, and an L-SIG field. The L-STF field indicates a short training signal decoded by both a wireless communication terminal supporting the embodiment of the present invention and a wireless communication terminal not supporting the embodiment of the present invention. The training signal is a signal that assists the demodulation and decoding setting of a wireless communication terminal for receiving the signal to be transmitted after the transmission of the training signal. The short training signal is a training signal having a relatively short signal length. Specifically, a wireless communication terminal may perform Automatic Gain Control (AGC) on an OFDM symbol including an L-LTF field and an L-SIG field based on a short training signal. Also, the wireless communication terminal may synchronize the timing and frequency with the OFDM symbol including the L-SIG field based on the short training signal.

The L-LTF field indicates a long training signal decoded by both a wireless communication terminal supporting the embodiment of the present invention and a wireless communication terminal not supporting the embodiment of the present invention. The long training signal is a training signal having a relatively long signal length. Specifically, the wireless communication terminal may estimate the frequency offset including the L-SIG field based on the long training signal.

The L-SIG field is signaling information decoded by both a wireless communication terminal supporting the embodiment of the present invention and a wireless communication terminal not supporting the embodiment of the present invention. Specifically, the L-SIG field may signal information on a data rate and a data length.

The non-legacy preamble may include an HE-SIG-A field, an HE-SIG-B field, an HE-STF, and an HE-LTF.

The HE-SIG-A field signals information that is commonly applied to a plurality of second wireless communication terminals.

The HE-SIG-B field signals information on each of a plurality of second wireless communication terminals.

The HE-STF indicates a short training signal that the wireless communication terminal supporting the embodiment of the present invention decodes. A wireless communication terminal supporting an embodiment of the present invention may perform Automatic Gain Control (AGC) on an OFDM symbol including data in the HE-LTF, the HE-SIG-B field, and the payload based on a short training signal. In addition, a wireless communication terminal supporting an embodiment of the present invention may perform synchronization with respect to the timing and frequency of an OFDM symbol including data in the HE-LTF and the payload based on a short training signal.

The HE-LTF indicates a long training signal that the wireless communication terminal supporting the embodiment of the present invention decodes. A wireless communication terminal supporting an embodiment of the present invention may estimate the frequency offset and the channel of an OFDM symbol including data in the payload based on a long training signal. Specifically, a wireless communication terminal supporting an embodiment of the present invention may estimate a channel through which data is transmitted based on a long training signal. In addition, the wireless communication terminal supporting the embodiment of the present invention may estimate the frequency offset of the OFDM symbol based on the long training signal. In this specification, HE-LTF may indicate the HE-LTF itself or a long training signal included in the HE-LTF.

The HE-SIG-A field may be indicated by an OFDM x symbol and the HE-SIG-B may be represented by the length of an OFDM y symbol. At this time, as the value of x increases, the number of the second wireless communication terminals to which the first wireless communication terminal can transmit data increases. Specifically, the number of the second wireless communication terminals to which the first wireless communication terminal can transmit data may be any one of 4, 8, 12, and 16 depending on the value of x. Also, a variable number of HE-LTFs may be transmitted according to the number of Spatial Streams transmitted by a wireless communication terminal.

In the embodiment of FIG. 6, L-STF, L-LTF, L-SIG, HE-SIG-A and HE-SIG-B of the physical frame are modulated to 64 FFT-based OFDM symbols. In addition, each one after the HE-STF of the physical frame to the data frame is modulated to a 256 FFT-based OFDM symbol.

It is assumed that the minimum data transmission rate is 6 Mbps and since the maximum length of the physical frame is 1366 symbols, the entire transmission maximum time from the HE-STF to the data field may be limited to 5.464 ms.

HE-STF is divided into HE-STF-short and HE-STF-long depending on the application. The HE-STF-short may be used in a single user (SU) downlink transmission physical frame, a multi user (MU) downlink transmission physical frame, and an SU uplink transmission physical frame. The HE-STF-short may have a total length of 0.4 us in the form that a signal pattern having a length of 0.8 us on the time axis is repeated five times. The HE-STF-long may be used in an upward MU physical frame. The HE-STF-long may have a total length of 8.0 us in the form that a signal pattern having a length of 1.6 us is repeated five times.

HE-LTF is divided into HE-LTF-short and HE-LTF-long depending on the application. HE-LTF-short may be used in indoor communication. HE-LTF-short may have a length equal to the sum of 6.4 us and a guard interval length. HE-LTF-long may be used in outdoor communication. HE-LTF-long may have a length equal to the sum of 12.8 us and a guard interval length.

Also, the physical frame may include an HE-SIG-C field. The HE-SIG-C field may be used in an MU-MIMO transmission. Specifically, the HE-SIG-C field may indicate at least one of a Modulation Coding Scheme (MCS) for each second wireless communication terminal and a data length. The HE-SIG-C field may have a variable length. However, according to a specific embodiment, the HE-SIG-B field may indicate at least one of an MCS for each second wireless communication terminal and a data length without the HE-SIG-C field.

Figure 7:
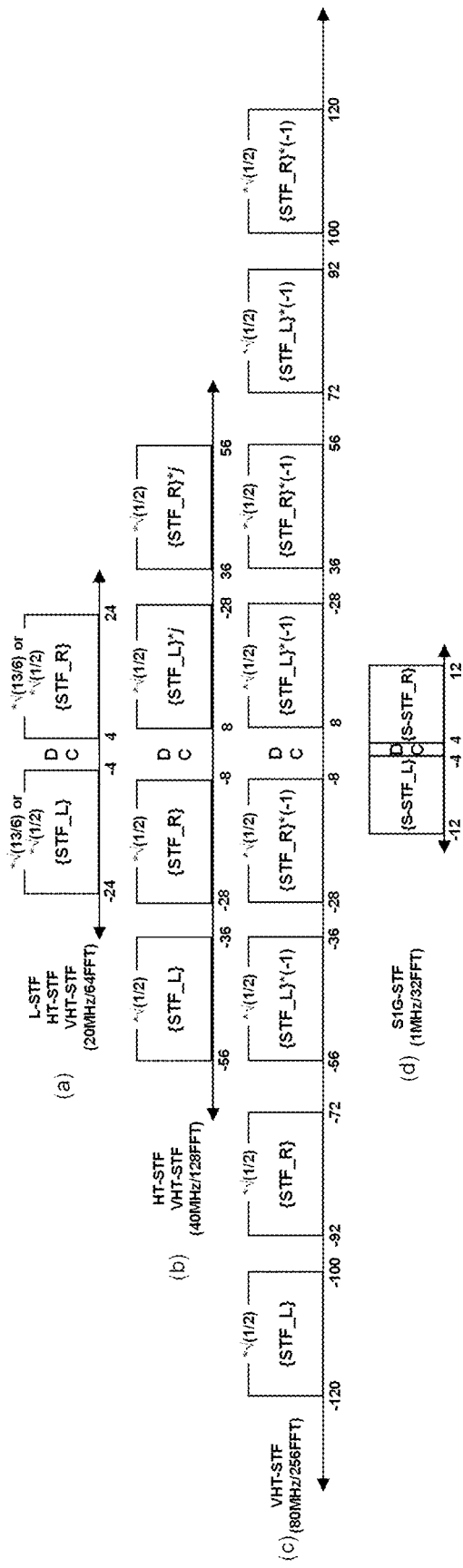
FIG. 7 illustrates a pattern of a short training signal according to an embodiment of the present invention.
Figure 8:
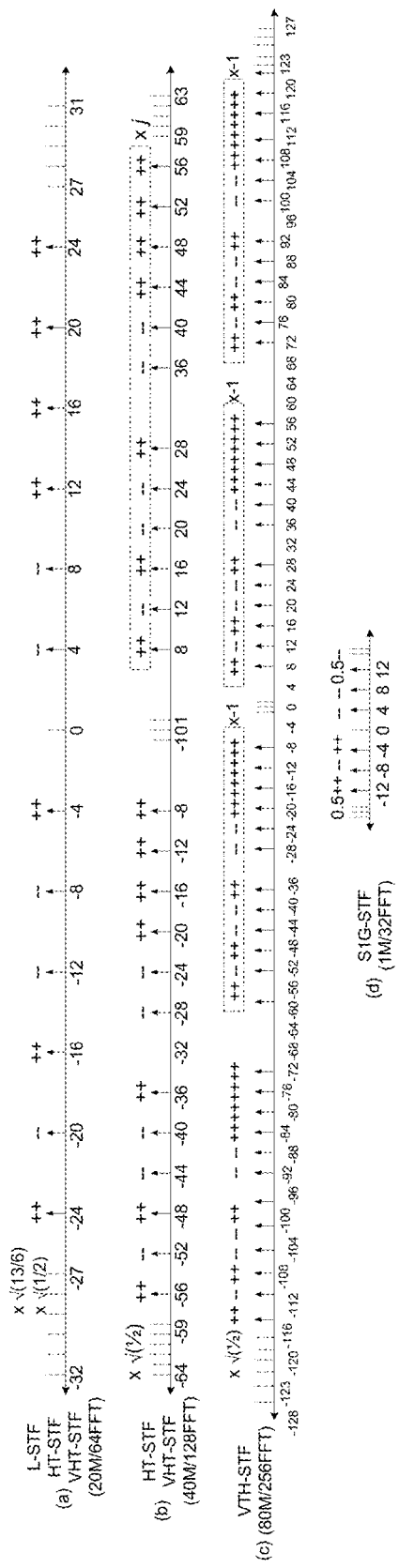
FIG. 8 illustrates a specific signal pattern of a subcarrier included in the short training signal described with reference to FIG. 7.

The format of the short training signal will be described in detail with reference to FIGS. 7 to 8. FIG. 7 schematically illustrates a pattern of a short training signal according to an embodiment of the present invention. In addition, FIG. 8 illustrates the pattern of the short training signal in detail, which is described with reference to FIG. 7.

Specifically, FIGS. 7(a) and 8(a) illustrate a short training signal that is modulated to 64 FFT and transmitted through a 20 MHz frequency bandwidth.

In the case of transmitting a short training signal modulated to 64 FFT through a 20 MHz frequency bandwidth, the short training signal includes a total of 64 subcarriers. In FIG. 7(a) and FIG. 8(a), six subcarriers at the left and five subcarriers at the right are located in the guard band. For convenience of explanation, if the subcarriers located at −a to b are represented by (−a, b), the short training signals in FIGS. 7A and 8A may be expressed by (−26, 26). In this case, the subcarrier included in the short training signal has the following values.

$$\{L-STF\_(-26, 26)\} =$$
$$(\sqrt{(13/6)} \text{ or } \sqrt{(1/2)}^* \{0, 0, 1+j, 0, 0, 0, -1-j, 0, 0,$$
$$0, 1+j, 0, 0, 0, -1-j, 0, 0, 0, -1-j, 0, 0, 0, 1+j,$$
$$0, 0, 0, 0, 0, 0, 0, -1-j, 0, 0, 0, -1-j, 0, 0, 0,$$
$$1+j, 0, 0, 0, 1+j, 0, 0, 0, 1+j, 0, 0, 0, 1+j, 0, 0\}$$

In FIG. 7(a) and FIG. 8(a), subcarriers transmit signals. At this time, 12 subcarriers have a value of 1+j or −1−j. Further, the subcarrier is multiplied by a scaling value for adjusting the magnitude of the short training signal. Specifically, the wireless communication terminal may transmit a short training signal having a magnitude equal to that of the long training signal. For example, in the 802.11a standard, all 52 subcarriers included in the long training signal in the 20 MHz frequency bandwidth transmit signals, and the modulation magnitude of the short training signal is √2. Therefore, in the 802.11a standard, the scaling value applied to the short training signal is a value obtained by dividing the number of subcarriers transmitting signals in the long training signal by the number of subcarriers transmitting the signals in the short training signal, and again dividing it by the modulation magnitude of the short training signal, that is, √52/(12×2)=√(13/6).

In another specific embodiment, a wireless communication terminal may transmit a short training signal whose sum of transmission power is 1 on the entire time axis. For example, in the 802.11n standard, the modulation magnitude of the short training signal is √2. Therefore, the wireless communication terminal must multiply √(½) in order for the sum of the transmission power to be 1 on the entire time axis. Therefore, the scaling value applied to the short training signal in the 802.11n standard is 1.

In order to describe a short training signal transmitted through a frequency bandwidth other than 20 MHz, the pattern of the short training signal described with reference to FIGS. 7(a) and 8(a) may represent the left pattern as STF_L and the right pattern as STF_R based on the DC band. Specifically, STF_L and STF_R represent the following signal patterns.

$$\{STF\_L\} = \{1+j, 0, 0, 0, -1-j, 0, 0, 0,$$
$$1+j, 0, 0, 0, -1-j, 0, 0, 0, -1-j, 0, 0, 0, 1+j, 0, 0, 0, 1+j\}$$
$$\{STF\_R\} = \{-1-j, 0, 0, 0, -1-j, 0, 0, 0, 1+j,$$
$$0, 0, 0, 1+j, 0, 0, 0, 1+j, 0, 0, 0, 1+j\}$$

Also, for convenience of explanation, allocating 0 to consecutive n subcarriers is represented by {0×n}. Accordingly, the short training signals of FIGS. 7(a) and 8(a) may be expressed as follows.

$$\{L-STF\_(-26, 26)\} =$$
$$(\sqrt{(13/6)} \text{ or } \sqrt{(1/2)})^*\{0, 0, \{STF\_L\}, \{0X7\}, \{STF\_R\}, 0, 0\}$$

FIGS. 7(b) and 8(b) illustrate a short training signal that is modulated to 128 FFT and transmitted through a 40 MHz frequency bandwidth.

$$\{HT/VHT-STF\_(-58, 58)\} =$$
$$\sqrt{(1/2)}^*\{0, 0, \{STF\_L\}, \{0X7\}, \{STF\_R\}, \{0X15\},$$
$$\{STF\_L\}^*j, \{0X7\}, \{STF\_R\}^*j, 0, 0\}$$

In the case of transmitting a short training signal through a frequency bandwidth of 20 MHz or more, the wireless communication terminal uses the pattern of the short training signal described in FIGS. 7(a) and 8(a) as a basic pattern, and transmits a short training signal in which the basic pattern is repeated in a 20 MHz unit. At this time, the wireless communication terminal may move the phase of the basic pattern to reduce the Peak to Average Power Ratio (PAPR). In FIGS. 7(b) and 8(b), the wireless communication terminal shifts the phase of the second located basic pattern by j.

FIGS. 7(c) and 8(c) illustrate a short training signal that is modulated to 256 FFT and transmitted through an 80 MHz frequency bandwidth.

$$\{VHT-SFT\_(-122, 122)\} =^*$$
$$\{0, 0, (STF\_L\}, \{0X7\}, \{STF\_R\}, \{0X15\}, \{STF\_L\}^*(-1), \{0X7\},$$
$$\{STF\_R\}^*(-1), \{0X15\}, \{STF\_L\}^*(-1), \{0X7\}, \{STF\_R\}^*(-1),$$
$$\{0X15\}, \{STF\_L\}^*(-1), \{0X7\}, \{STF\_R\}^*(-1), 0, 0\}$$

In FIGS. 7(c) and 8(c), the wireless communication terminal uses the pattern of the short training signal described with reference to FIGS. 7(a) and 8(a) as a basic pattern and transmits a short training signal in which the basic pattern is repeated in a 20 MHz unit. Also, the wireless communication terminal shifts the phases of the second, third, and fourth basic patterns by −1.

FIGS. 7(d) and 8(d) illustrate a short training signal that is modulated to 32 FFT and transmitted through a 1 MHz frequency bandwidth.

$$\{S1G-STF\_(-13, 13)\} = \{0, 0.5^*(1+j), 0, 0, 0, -1-j, 0, 0, 0, 1+j, 0,$$
$$0, 0, 0, 0, 0, -1-j, 0, 0, 0, -1-j, 0, 0, 0, 0.5^*(-1-j), 0\}$$

At this time, the pattern of the short training signal may represent the left pattern as S-STF_L and the right pattern as S-STF_R based on the DC band. Specifically, S-STF_L ≠ S-STF_R represent the following signal patterns.

$$\{S-STF\_L\} = \{0.5^*(1+j), 0, 0, 0, -1+j, 0, 0, 0, 1+j\}$$
$$\{S-STF\_R\} = \{-1-j, 0, 0, 0, -1-j, 0, 0, 0, 0.5^*(-1-j)\}$$

Using the S-STF_L and the S-STF_R, the short training signals of FIGS. 7(d) and 8(d) may be expressed as follows.

$$\{SIG-STF\_(-13, 13)\} = \{0, \{S-STF\_L\}, \{0X7\}, \{S-STF\_R\}, 0\}$$

As described above, the wireless communication terminal according to an embodiment of the present invention transmits the HE-STF modulated to 256 FFT through the 20 MHz frequency bandwidth. Therefore, when the wireless communication terminal uses the same frequency bandwidth and transmits a training signal in which a basic signal pattern having the same length as the training signal described above is repeated in the time domain, a larger number of subcarriers than the short training signal described with reference to FIGS. 7 and 8 are transmitted. Specifically, when the short training signal is transmitted through the 20 MHz frequency bandwidth, the wireless communication terminal transmits four times more subcarriers than the embodiment described with reference to FIGS. 7 and 8. Therefore, a pattern of the short training signal different from the pattern of the short training signal described with reference to FIGS. 7 to 8 is required.

The wireless communication terminal may transmit a short training signal in which the intervals of subcarriers for transmitting signals in the basic pattern are adjusted. At this time, the basic pattern may be STF_L and STF_R described above. Further, the intervals of subcarriers for transmitting signals may be determined based on the number of subcarriers that can be transmitted over the entire frequency band. Specifically, the intervals of subcarriers for transmitting signals may be determined in proportion to the number of subcarriers that can be transmitted over the entire frequency band. For example, when the number of subcarriers that can be transmitted over the entire frequency band is 64, on the basis of four intervals of subcarriers for transmitting signals, the intervals of the subcarriers that transmit signals may be determined in proportion to the number of subcarriers that can be transmitted over the entire frequency band. The number of subcarriers of a training signal that can be transmitted over the entire frequency band is determined according to the frequency bandwidth, the FFT scheme, and the length of the basic pattern of the training signal in the time domain. Specific embodiments will be described with reference to FIGS. 9 and 10.

Figure 9:
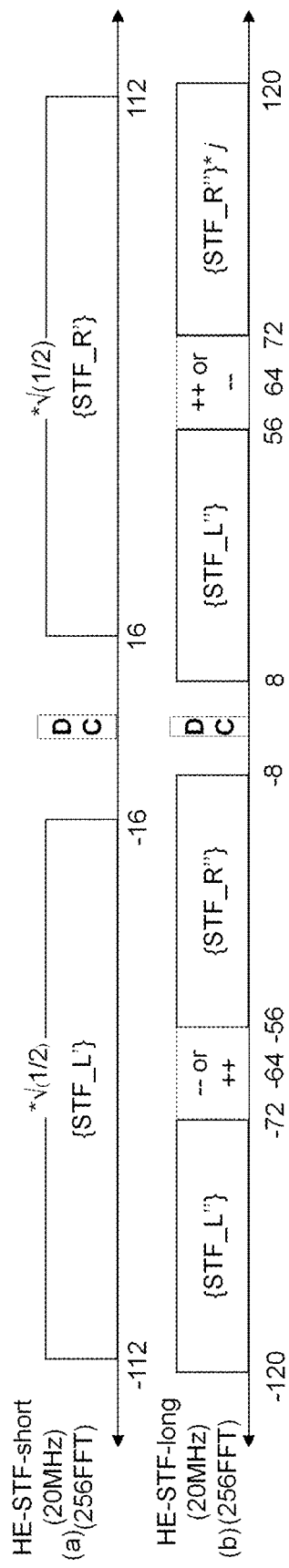
FIG. 9 briefly illustrates a pattern of a short training signal.
Figure 10:
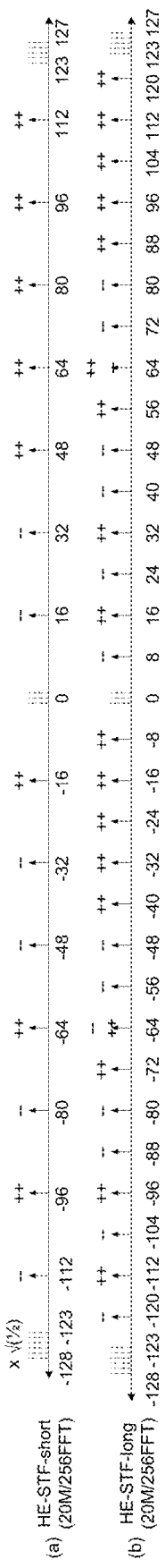
FIG. 10 illustrates the pattern of the short training signal in detail, which is described with reference to FIG. 9.

FIGS. 9 and 10 illustrate a short training signal transmitted through HE-STF according to an embodiment of the present invention. Specifically, FIG. 9 briefly illustrates the pattern of the short training signal. In addition, FIG. 10 illustrates the pattern of the short training signal in detail, which is described with reference to FIG. 9.

FIGS. 9(a) and 10(a) illustrate a pattern of a short training signal transmitted through HE-STF-short in a 20 MHz frequency bandwidth.

As shown in FIGS. 9(a) and 10(a), a wireless communication terminal uses 256 FFT in a 20 MHz frequency bandwidth. At this time, the wireless communication terminal may set the interval of a subcarrier transmitting a short training signal transmitted through HE-STF-short to 16 in order to generate a signal repeated 16 times during the OFDM 1 symbol of 12.8 us. At this time, the basic pattern length of the short training signal of HE-STF-short in the time domain is 0.8 us. In addition, the short training signal of HE-STF-short is a signal having a length of 4 us which is obtained by sampling corresponding five basic signals. For example, the pattern of the short training signal transmitted through HE-STF-short may be as follows.

$$\{HE-STF-short\_(-122, 122)\} =$$
$$\sqrt{(1/2)}^*\{\{0X10\}, -1-j, \{0X15\}, 1+j, \{0X15\}, -1-j, \{0X15\},$$
$$1+j, \{0X15\}, -1-j, \{0X15\}, -1-j, \{0X15\}, 1+j,$$
$$\{0X31\}, -1-j, \{0X15\}, -1-j, \{0X15\}, 1+j, \{0X15\},$$
$$1+j, \{0X15\}, 1+j, \{0X15\}, 1+j, \{0X15\}, 1+j, \{0X10\}\}$$

The pattern of the short training signal transmitted through HE-STF-short may represent the left pattern as STF_L' and the right pattern as STF_R' based on the DC band.

$$\{STF\_L'\} = \{-1-j, \{0X15\}, 1+j, \{0X15\}, -1-j, \{0X15\},$$
$$1+j, \{0X15\}, -1-j, \{0X15\}, -1-j, \{0X15\}, 1+j\}$$
$$\{STF\_R'\} = \{-1-j, \{0X15\}, -1-j, \{0X15\},$$
$$1+j, \{0X15\}, 1+j, \{0X15\}, 1+j,$$

STF_L' and STF_R' are obtained by adjusting the intervals of the subcarriers for transmitting signals in STF_L and STF_R described above to 16. In addition, STF_L' and STF_R' are patterns that add a signal value for minimizing the PAPR to −112 and 112 positions.

FIGS. 9(b) and 10(b) illustrate a pattern of a short training signal transmitted through HE-STF-long.

As shown in FIGS. 9(b) and 10(b), a wireless communication terminal uses 256 FFT in a 20 MHz frequency bandwidth. The wireless communication terminal may set the interval of a subcarrier transmitting a long training signal transmitted through HE-STF-long to 8 in order to generate a signal repeated 8 times during the OFDM 1 symbol of 12.8 us. At this time, the basic pattern length of the short training signal of HE-STF-long in the time domain is 1.6 us. In addition, the short training signal of the HE-STF-long is a signal having a length of 8 us which is obtained by sampling corresponding five basic signals. For example, the pattern of the short training signal transmitted through HE-STF-long may be as follows.

$$\{HE-STF-long\_(-122, 122)\} =$$
$$S^*\{0, 0, \{STF-L''\}, \{0X7\}, \{-1-j \text{ or } +1+j\}, \{0X7\}, \{STF-R''\},$$
$$\{0X15\}, \{STF-L''\}, \{0X7\}, \{1+j \text{ or } -1-j\}, \{0X7\}, \{STFR''\}, 0, 0\}$$

Here, S represents a scaling value applied to the short training signal. The scaling value applied to the short training signal will be described in detail with reference to FIGS. 11 to 17. The pattern of the short training signal transmitted through HE-STF-short may represent the left pattern as STF_L'' and the right pattern as STF_R'' based on the DC band.

$$\{STF\_L''\} = \{-1-j, \{0X7\}, 1+j, \{0X7\}, -1-j,$$
$$\{0X7\}, 1+j, \{0X7\}, -1-j, \{0X7\}, -1-j, \{0X7\}, 1+j\}$$
$$\{STF\_R''\} = \{-1-j, \{0X7\}, -1-j, \{0X7\}, 1+j, \{0X7\},$$
$$1+j, \{0X7\}, 1+j, \{0X7\}, 1+j, \{0X7\}, 1+j\}$$

STF_L'' and STF_R'' are obtained by adjusting the intervals of the subcarriers for transmitting signals in STF_L and STF_R described above to 8. In addition, STF_L'' and STF_R'' are patterns that add a signal value for minimizing the PAPR to −64 and 64. Specifically, STF_L'' and STF_R'' are obtained by adding −1−j and 1+j or 1+j and −1−j to the positions of −64 and 64, respectively.

As described above, the plurality of second wireless communication terminals may transmit data to the first wireless communication terminal through OFDMA. A training signal transmitted by a plurality of wireless communication terminals, when the plurality of second wireless communication terminal communicate with a first wireless communication terminal by using OFDMA, is described with reference to FIGS. 11 to 17.

Figure 11:
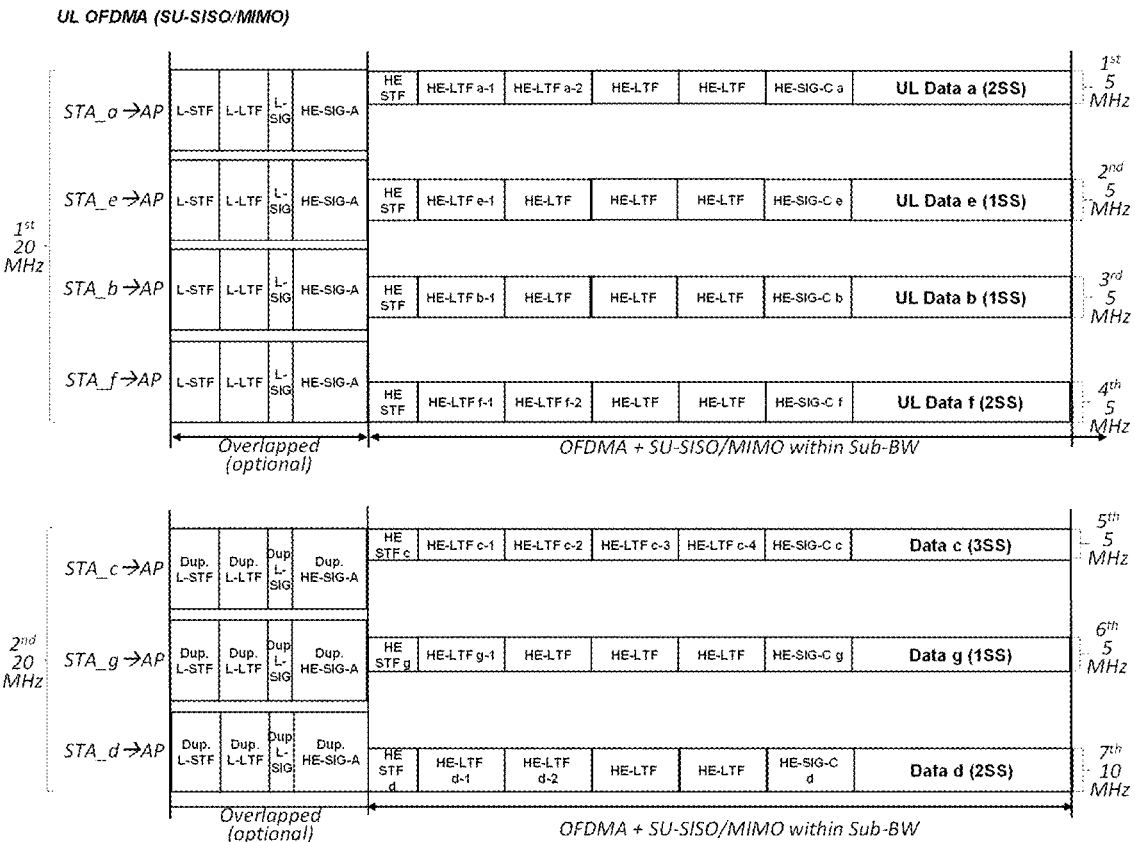
FIG. 11 illustrates a physical frame transmitted by a plurality of stations when the plurality of stations transmit data to an AP.

FIG. 11 illustrates a physical frame transmitted by a plurality of stations when the plurality of stations transmit data to an AP.

A plurality of second wireless communication terminals may repeatedly transmit a legacy preamble for signaling information for a wireless communication terminal that does not support an embodiment of the present invention. Specifically, the plurality of second wireless communication terminals may transmit the same legacy preamble through the same frequency band. At this time, the legacy preamble may include at least one of L-STF, L-LTF, and L-SIG. Also, the plurality of second wireless communication terminals may repeatedly transmit the signaling field among the non-legacy preambles for signaling the information for a wireless communication terminal that supports an embodiment of the present invention. Specifically, the plurality of second wireless communication terminals may transmit the signaling field of the same non-legacy preamble through the same frequency band. At this time, the signaling field may be the HE-SIG-A field described above.

In another specific embodiment, the plurality of second wireless communication terminals may transmit a multi-plexed legacy preamble. Also, the plurality of second wireless communication terminals may transmit the signaling field among the non-legacy preambles in a combined form. At this time, the combination may represent a combination in the frequency band or a combination in the rectangular coordinate.

When at least one second wireless communication terminal performs MIMO transmission, the number of space-time streams transmitted by each of the plurality of second wireless communication terminals may be different from each other. The duration of HE-LTF to be transmitted varies depends on the number of space-time streams. Accordingly, when at least one second wireless communication terminal performs MIMO transmission, data, HE-STF, and HE-LTF may be simultaneously transmitted to the first wireless communication terminal. In this case, the guard interval may be different for each sub-frequency band in the entire frequency band to which OFDMA is applied. Therefore, the transmission and reception complexity may increase. Thus, the second wireless communication terminal needs to align the OFDM symbol transmitted from a second wireless communication terminal to the first wireless communication terminal and the OFDM symbol transmitted from another second wireless communication terminal to the first wireless communication terminal.

Accordingly, the second wireless communication terminal may align the durations of the OFDM symbol of a training signal transmitted from a second wireless communication terminal to the first wireless communication terminal and the OFDM symbol of a training signal transmitted from another second wireless communication terminal to the first wireless communication terminal. Specifically, the second wireless communication terminal may start the HE-LTF transmission to the first wireless communication terminal at the same time as another second wireless communication terminal, and stop the HE-LTF transmission to the first wireless communication terminal at the same time as the other second wireless communication terminal. Specifically, the second wireless communication terminal may transmit the same number of HE-LTFs as the number of HE-LTFs transmitted by another second wireless communication terminal to the first wireless communication terminal. For example, the plurality of second wireless communication terminals may transmit the same number of HE-LTFs as the second wireless communication terminals requiring the largest number of HE-LTFs among the plurality of second wireless communication terminals. To this end, the second wireless communication terminal may transmit the additional HE-LTF. In another specific embodiment, the plurality of second wireless communication terminals may transmit the same number of HE-LTFs as the second wireless communication terminals requiring the smallest number of HE-LTFs among the plurality of second wireless communication terminals. To this end, the second wireless communication terminal may transmit the multiplexed HE-LTF. The multiplexed HE-LTF indicates LTF combining a plurality of HE-LTFs into one. Specifically, the multiplexed HE-LTF may be a combination of a plurality of LTFs on the frequency axis. In another specific embodiment, the multiplexed HE-LTF may be a combination of a plurality of LTFs on the orthogonal code axis.

In addition, the plurality of second wireless communication terminals may transmit the training signals through the sub-frequency band allocated to each of the plurality of second wireless communication terminals.

In the embodiment of FIG. 11, the first to seventh stations STA_a, STA_b, STA_c, STA_d, STA_e, STA_f, and STA_g transmit data to the AP. At this time, the first to seventh stations STA_a, STA_b, STA_c, STA_d, STA_e, STA_f, and STA_g repeatedly transmit L-STF, L-LTF, L-SIG, and HE-SIG-A to the AP.

The first to seventh stations STA_a, STA_b, STA_c, STA_d, STA_e, STA_f, and STA_g transmit HE-STF, HE-LTF, HE-SIG-C, and data to the AP through a sub-frequency band allocated to each of the first to seventh stations STA_a, STA_b, STA_c, STA_d, STA_e, STA_f, and STA_g.

At this time, the first to seventh stations STA_a, STA_b, STA_c, STA_d, STA_e, STA_f, and STA_g transmit the same number of HE-LTFs. The third station STA_c requires four HE-LTFs. Therefore, the third station STA_c requires the largest number of HE-LTFs among the first to seventh stations STA_a, STA_b, STA_c, STA_d, STA_e, STA_f, and STA_g. Accordingly, the first station STA_a transmits two additional HE-LTFs. In addition, the second station STA_b transmits three additional HE-LTFs. In addition, the fourth station STA_d transmits two additional HE-LTFs. In addition, the fifth station STA_e transmits three additional HE-LTFs. In addition, the sixth station STA_f transmits two additional HE-LTFs. In addition, the seventh station STA_b transmits three additional HE-LTFs.

In order for the first wireless communication terminal to receive data based on the training signal, the training signal transmitted from each of the plurality of second wireless communication terminals must have a uniform magnitude. When each of the plurality of second wireless communication terminals transmits the subcarrier of a training signal with the same magnitude, the training signals transmitted from each of the plurality of second wireless communication terminals to the first wireless communication terminal may not be uniform. Therefore, a method for the second wireless communication terminal to determine a scaling value for adjusting the magnitude of a training signal is required. In addition, whether the second wireless communication terminal transmits a subcarrier corresponding to a frequency band not allocated to the plurality of second wireless communication terminals among a plurality of subcarriers included in a training signal. In addition, it becomes a problem whether the second wireless communication terminal transmits a subcarrier corresponding to a frequency band not allocated to the plurality of second wireless communication terminals among a plurality of subcarriers included in a training signal. This will be described with reference to FIGS. 12 to 17.

Figure 12:
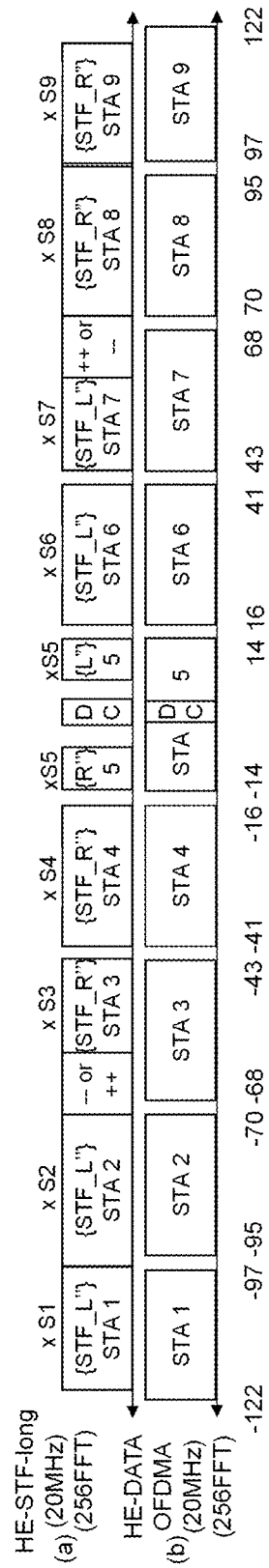
FIG. 12 illustrates a pattern of a training signal corresponding to HE-STF-long transmitted by nine stations to an AP according to an embodiment of the present invention.
Figure 13:
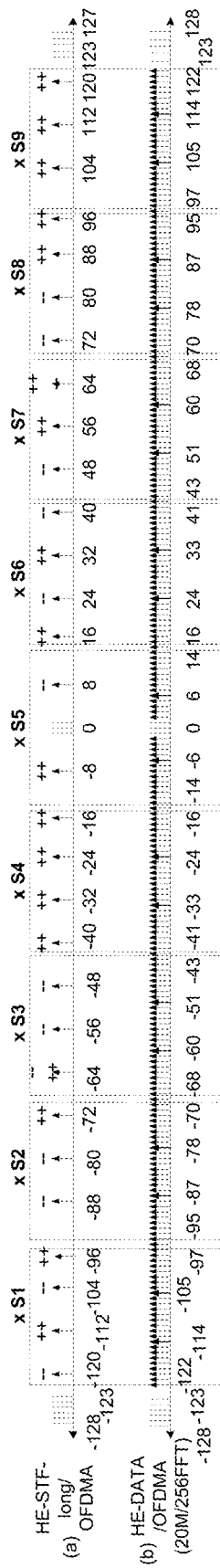
FIG. 13 specifically illustrates a pattern of a training signal corresponding to HE-STF-long transmitted by nine stations to an AP according to an embodiment of the present invention.

FIG. 12 illustrates a pattern of a training signal corresponding to HE-STF-long transmitted by nine stations to an AP according to an embodiment of the present invention. FIG. 13 specifically illustrates a pattern of a training signal corresponding to HE-STF-long transmitted by nine stations to an AP according to an embodiment of the present invention.

The second wireless communication terminal transmits a subcarrier of a training signal corresponding to the sub-frequency band allocated to the second wireless communication terminal. However, when the plurality of second wireless communication terminals transmit data to the first wireless communication terminal through OFDMA, interference may occur between signals transmitted by the plurality of second wireless communication terminals. Therefore, the first wireless communication terminal may allocate the remaining sub-frequency bands except for the guard frequency band to the plurality of second wireless communication terminals in order to prevent interference between signals transmitted by the plurality of second wireless communication terminals. Accordingly, a part of the subcarriers of the training signal may correspond to a sub-frequency band not assigned to a second wireless communication terminal.

If the subcarrier of the training signal corresponds to a sub-frequency band not allocated to a second wireless communication terminal, the plurality of second wireless communication terminals may not transmit the corresponding subcarrier.

In another specific embodiment, when the subcarrier of the training signal corresponds to a sub-frequency band not allocated to a second wireless communication terminal, the second wireless communication terminal, to which a sub-frequency band adjacent to the frequency band through which the corresponding subcarrier is transmitted is allocated, may transmit the corresponding subcarrier. For convenience of explanation, a subcarrier corresponding to a sub-frequency band not allocated to a second wireless communication terminal is referred to as an additional subcarrier. Specifically, a plurality of second wireless communication terminals that is allocated a sub-frequency band adjacent to a frequency band through which an additional subcarrier is transmitted may transmit an additional subfrequency band at the same time. At this time, each of the plurality of second wireless communication terminals may scale the magnitude of a signal for transmitting an additional subcarrier based on the number of the plurality of second wireless communication terminals. For example, each of the first and second stations may transmit an additional subcarrier with ½ of the signal magnitude required for additional subcarrier transmission. At this time, the sub-frequency band where an additional subcarrier is located is a sub-frequency band not allocated to a second wireless communication terminal, and the sub-frequency band allocated to each of the first station and the second station is adjacent to a sub-frequency band where an additional subcarrier is located.

In another specific embodiment, if a subcarrier of the training signal corresponds to a sub-frequency band not allocated to a second wireless communication terminal, any one second wireless communication terminal may transmit an additional subcarrier. At this time, the plurality of second wireless communication terminals may be a second wireless communication terminal to which a frequency band adjacent to a sub-frequency band is allocated, where an additional subcarrier is located.

At this time, the first wireless communication terminal may transmit information signaling a second wireless communication terminal that is to transmit an additional subcarrier. Specifically, the HE-SIG-B field described above may include information signaling a second wireless communication terminal that is to transmit an additional subcarrier. The second wireless communication terminal may obtain information signaling a second wireless communication terminal that is to transmit an additional subcarrier and may transmit an additional subcarrier based on information signaling the second wireless communication terminal that is to transmit the additional subcarrier.

In another specific embodiment, if a subcarrier of the training signal corresponds to a sub-frequency band not allocated to a second wireless communication terminal, the first wireless communication terminal may transmit information signaling a method of transmitting an additional subcarrier. At this time, the information signaling the method of transmitting the additional subcarrier may indicate which one of the second wireless communication terminals is to transmit an additional subcarrier or whether the plurality of second wireless communication terminals transmit an additional subcarrier. Further, the information signaling the method of transmitting the additional subcarrier may indicate a second wireless communication terminal that is to transmit an additional subcarrier. In addition, the information signaling the method of transmitting the additional subcarrier is applied when an additional subcarrier is transmitted to indicate a scaling value for adjusting the magnitude of a signal including the additional subcarrier.

In the embodiment of FIGS. 12 and 13, a sub-frequency band corresponding to the locations of −96 and 96 is not allocated to any station. Also, two of the HE-STF-long subcarriers transmit signals at the locations of −96 and 96, respectively. Therefore, it becomes a problem which station transmits a subcarrier corresponding to −96 and 96. In the embodiment of FIGS. 12 and 13, the first station STA 1 transmits a subcarrier of HE-STF-long located at −96. Further, the eighth station STA 8 transmits a subcarrier of HE-STF-long located at 96. At this time, the AP may transmit information signaling that the first station STA 1 transmits a subcarrier of HE-STF-long located at −96. In addition, the AP may transmit information signaling that the eighth station STA 8 transmits a subcarrier of HE-STF-long located at 96. At this time, the first station STA 1 may transmit a subcarrier of HE-STF-long located at −96 on the basis of the signaling information transmitted by the AP. In addition, the eighth station STA 8 may transmit a subcarrier of HE-STF-long located at 96 on the basis of the signaling information transmitted by the AP.

When the plurality of second wireless communication terminals transmit each of the subcarriers of the training signal with the same transmission power, the magnitude of the training signal received by the first wireless communication terminal from each of the plurality of second wireless communication terminals varies according to the number of subcarriers transmitted by each of the plurality of second wireless communication terminals. In this case, since the magnitude of the training signal received by the first wireless communication terminal from each of the plurality of second wireless communication terminals is not uniform, the first wireless communication terminal may not perform accurate Automatic Gain Control (AGC) based on the training signal. Also, the first wireless communication terminal may not accurately perform Frequency Offset Detection (FOD).

In order to solve this problem, when transmitting a subcarrier of the training signal corresponding to the sub-frequency band allocated to the second wireless communication terminal, the second wireless communication terminal may apply a training signal scaling value for adjusting the magnitude of the training signal in a band allocated to the second wireless communication terminal. At this time, the second wireless communication terminal may determine the training signal scaling value based on the number of subcarriers of the training signal corresponding to the sub-frequency band allocated to the second wireless communication terminal. Specifically, the second wireless communication terminal may determine a training signal scaling value based on the number of entire subcarriers corresponding to the sub-frequency band allocated to the second wireless communication terminal and the number of subcarriers of the training signal corresponding to the sub-frequency band allocated to the second wireless communication terminal. The number of entire subcarriers corresponding to the sub-frequency band allocated to the second wireless communication terminal may indicate the number of subcarriers used for transmitting data through the sub-frequency band allocated to the second wireless communication terminal. At this time, subcarriers used for transmitting data may include subcarriers for transmitting data and also subcarriers for transmitting pilot signals. For example, based on a value obtained by dividing the number of subcarriers of the training signal corresponding to the sub-frequency band allocated to the second wireless communication terminal by the number of entire subcarriers corresponding to the sub-frequency band, the second wireless communication terminal may determine a training signal scaling value. Specifically, the second wireless communication terminal may determine the training signal scaling value in inverse proportion to the number of subcarriers of the training signal corresponding to the sub-frequency band allocated to the second wireless communication terminal.

Also, the second wireless communication terminal may determine the transmission power of the training signal based on the signal decrease that varies depending on the relative position between the second wireless communication terminal and the first wireless communication terminal. Accordingly, the second wireless communication terminal may determine the training signal scaling value. At this time, the relative position between the second wireless communication terminal and the first wireless communication terminal may be the distance between the second wireless communication terminal and the first wireless communication terminal.

In the embodiment of FIGS. 12 and 13, the first station STA 1 transmits four subcarriers among the subcarriers of HE-STF-long. Also, the second station STA 2 transmits three subcarriers among the subcarriers of HE-STF-long. Also, the third station STA 3 transmits three subcarriers among the subcarriers of HE-STF-long. Also, the fourth station STA 4 transmits four subcarriers among the subcarriers of HE-STF-long. Also, the fifth station STA 5 transmits two subcarriers among the subcarriers of HE-STF-long. Also, the fourth station STA 6 transmits four subcarriers among the subcarriers of HE-STF-long. Also, the seventh station STA 7 transmits three subcarriers among the subcarriers of HE-STF-long. Also, the eighth station STA 8 transmits four subcarriers among the subcarriers of HE-STF-long. Also, the ninth station STA 9 transmits three subcarriers among the subcarriers of HE-STF-long.

At this time, based on a value obtained by dividing 4, which is the number of subcarriers transmitted by each of the first station STA 1, the fourth station STA 4, the sixth station STA 6, and the eighth station STA 8 by 26, which is the number of entire subcarriers corresponding to the sub-frequency band allocated to each of the first station STA 1, the fourth station STA 4, the sixth station STA 6, and the eighth station STA 8, the first station STA 1, the fourth station STA 4, the sixth station STA 6, and the eighth station STA 8 may determine the training signal scaling value. In addition, based on a value obtained by dividing 3, which is the number of subcarriers transmitted by each the second station STA 2, the third station STA 3, the seventh station STA 7, and the ninth station STA 9 by 26, which is the number of entire subcarriers corresponding to the sub-frequency band allocated to each of the second station STA 2, the third station STA 3, the seventh station STA 7, and the ninth station STA 9, the second station STA 2, the third station STA 3, the seventh station STA 7, and the ninth station STA 9 may determine the training signal scaling value. In addition, based on a value obtained by dividing 2, which is the number of subcarriers transmitted by the fifth station STA 5 by 26, which is the number of entire subcarriers corresponding to the sub-frequency band allocated to the fifth station STA 5, the fifth station STA 5 may determine the training signal scaling value.

Through this, the AP may receive a short training signal of a uniform magnitude from each of the first station STA 1 to the ninth station STA 9. A specific embodiment for determining the training signal scaling value will be further described with reference to FIGS. 14 to 17.

Figure 14:
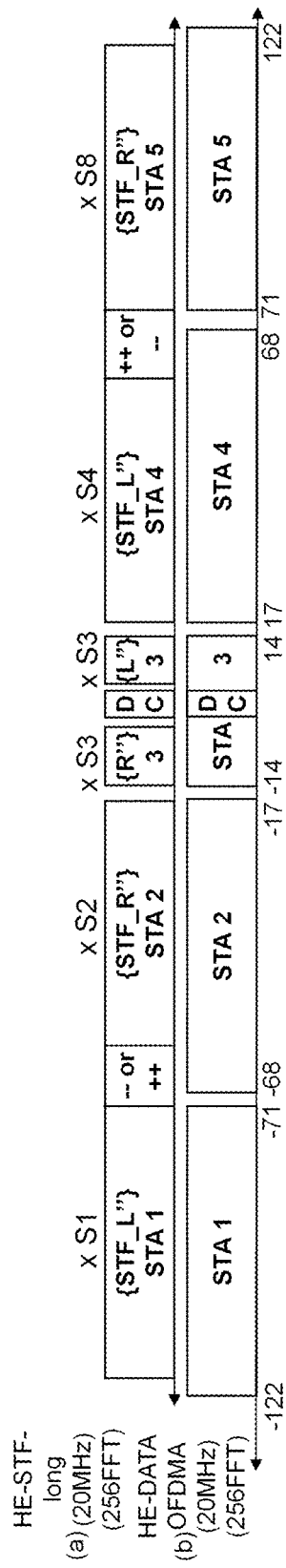
FIG. 14 illustrates a pattern of a training signal corresponding to HE-STF-long transmitted by five stations to an AP according to an embodiment of the present invention.
Figure 15:
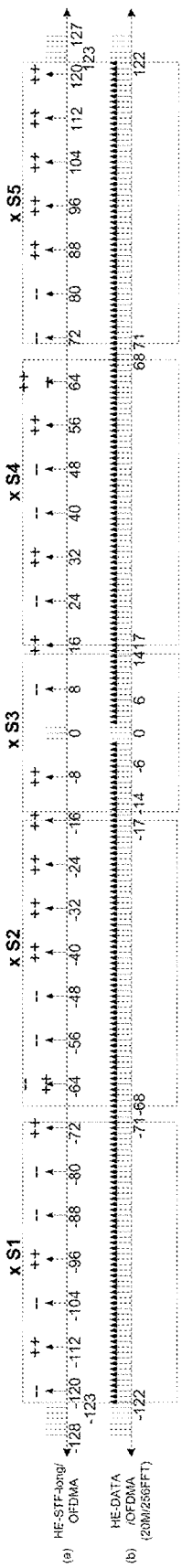
FIG. 15 specifically illustrates a pattern of a training signal corresponding to HE-STF-long transmitted by five stations to an AP according to an embodiment of the present invention.

FIG. 14 illustrates a pattern of a training signal corresponding to HE-STF-long transmitted by five stations to an AP according to an embodiment of the present invention. FIG. 15 specifically illustrates a pattern of a training signal corresponding to HE-STF-long transmitted by five stations to an AP according to an embodiment of the present invention.

In the embodiment of FIGS. 14 and 15, the first station STA 1 transmits seven subcarriers among the subcarriers of HE-STF-long. Also, the second station STA 2 transmits seven subcarriers among the subcarriers of HE-STF-long. Also, the third station STA 3 transmits two subcarriers among the subcarriers of HE-STF-long. Also, the fourth station STA 4 transmits seven subcarriers among the subcarriers of HE-STF-long. Also, the fifth station STA 5 transmits seven subcarriers among the subcarriers of HE-STF-long.

At this time, based on a value obtained by dividing 7, which is the number of subcarriers transmitted by each of the first station STA 1, the second station STA 2, the fourth station STA 4, and the fifth station STA 5 by 52, which is the number of entire subcarriers corresponding to the sub-frequency band allocated to each of the first station STA 1, the second station STA 2, the fourth station STA 4, and the fifth station STA 5, the first station STA 1, the second station STA 2, the fourth station STA 4, and the fifth station STA 5 may determine the training signal scaling value. In addition, based on a value obtained by dividing 2, which is the number of subcarriers transmitted by the third station STA 3 by 26, which is the number of entire subcarriers corresponding to the sub-frequency band allocated to the third station STA 3, the third station STA 3 may determine the training signal scaling value. Through this, the AP may receive a short training signal of a uniform magnitude from each of the first station STA 1 to the fifth station STA 5.

Figure 16:
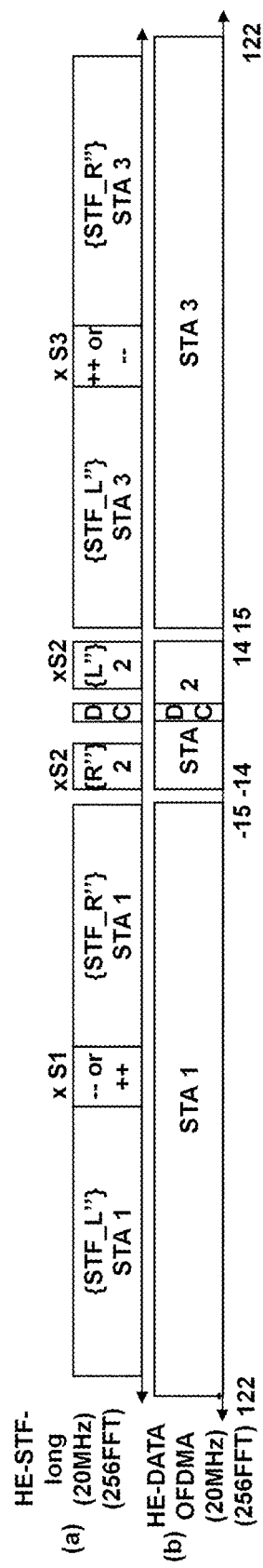
FIG. 16 illustrates a pattern of a training signal corresponding to HE-STF-long transmitted by three stations to an AP according to an embodiment of the present invention.
Figure 17:
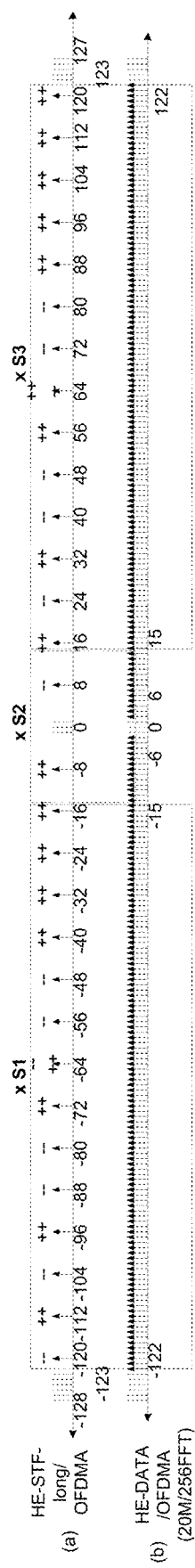
FIG. 17 specifically illustrates a pattern of a training signal corresponding to HE-STF-long transmitted by three stations to an AP according to an embodiment of the present invention.

FIG. 16 illustrates a pattern of a training signal corresponding to HE-STF-long transmitted by three stations to an AP according to an embodiment of the present invention. FIG. 17 specifically illustrates a pattern of a training signal corresponding to HE-STF-long transmitted by three stations to an AP according to an embodiment of the present invention.

In the embodiment of FIGS. 16 and 17, the first station STA 1 transmits 14 subcarriers among the subcarriers of HE-STF-long. Also, the second station STA 2 transmits two subcarriers among the subcarriers of HE-STF-long. Also, the third station STA 3 transmits 14 subcarriers among the subcarriers of HE-STF-long.

At this time, based on a value obtained by dividing 14, which is the number of subcarriers transmitted by each of the first station STA 1 and the third station STA 3 by 106, which is the number of entire subcarriers corresponding to the sub-frequency band allocated to the first station STA1 and the third station STA 3, the first station SAT1 and the third station STA 3 may determine the training signal scaling value. In addition, based on a value obtained by dividing 2, which is the number of subcarriers transmitted by the second station STA 2 by 26, which is the number of entire subcarriers allocated to the sub-frequency band allocated to the second station STA 2, the second station STA 2 may determine the training signal scaling value. Through this, the AP may receive a short training signal of a uniform magnitude from each of the first station STA 1 to the fifth station STA 3.

The embodiments described with reference to FIGS. 12 to 17 may be applied to the pattern of another training signal in addition to the patterns of the training signals described with reference to FIGS. 6 to 10.

Figure 18:
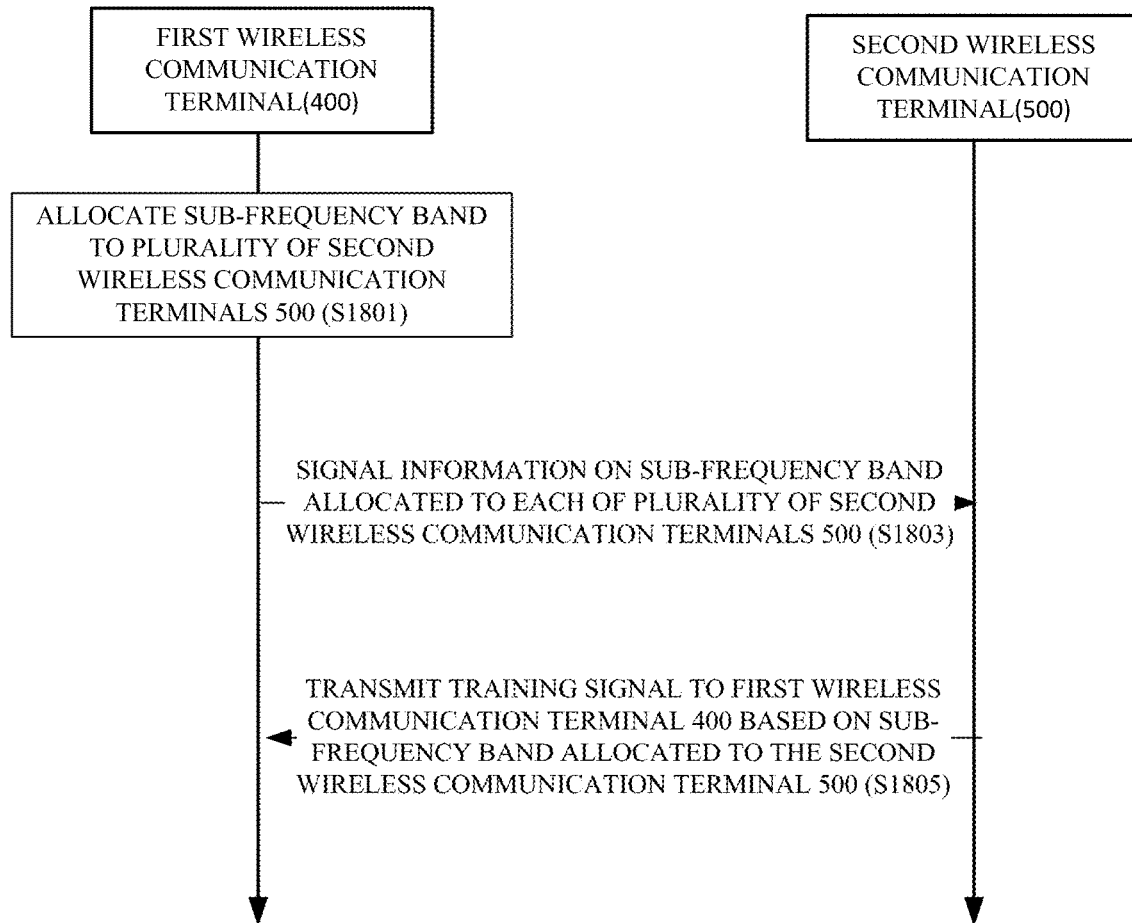
FIG. 18 is a ladder diagram illustrating operations of a first wireless communication terminal and a second wireless communication terminal according to an embodiment of the present invention.

FIG. 18 is a ladder diagram illustrating operations of a first wireless communication terminal and a second wireless communication terminal according to an embodiment of the present invention.

The first wireless communication terminal 400 allocates a sub-frequency band to the plurality of second wireless communication terminals 500 (S1801). As described above, the first wireless communication terminal 400 and the plurality of second wireless communication terminals may communicate through OFDMA. To this end, the first wireless communication terminal 400 allocates a sub-frequency band to the plurality of second wireless communication terminals 500.

The first wireless communication terminal 400 signals the information on the sub-frequency band allocated to each of the plurality of second wireless communication terminals 500 to each of the plurality of second wireless communication terminals 500 (S1803). The first wireless communication terminal 400 may signal the information on the sub-frequency band allocated to each of the plurality of second wireless communication terminals 500 to each of the plurality of second wireless communication terminals 500 through a trigger frame. Here, the trigger frame is a MAC frame for signaling information on the sub-frequency band allocated to each of the plurality of second wireless communication terminals. In another specific embodiment, the first wireless communication terminal 400 transmits information on the sub-frequency band allocated to each of the plurality of second wireless communication terminals 500 to each of the plurality of second wireless communication terminals 500 through the SIG-B field described above.

The second wireless communication terminal 500 transmits the training signal based on the sub-frequency band allocated to the second wireless communication terminal 500 (S1805). Specifically, the second wireless communication terminal 500 transmits a subcarrier of the training signal corresponding to the sub-frequency band allocated to the second wireless communication terminal 500.

If the subcarrier of the training signal corresponds to a sub-frequency band not allocated to a second wireless communication terminal 500, the plurality of second wireless communication terminals 500 may not transmit the corresponding subcarrier.

In another specific embodiment, when the sub-carrier of the training signal corresponds to a sub-frequency band not allocated to a second wireless communication terminal 500, the second wireless communication terminal 500, to which a sub-frequency band adjacent to the frequency band through which the corresponding subcarrier is transmitted is allocated, may transmit the corresponding subcarrier. For convenience of description, when the subcarrier of the training signal corresponds to a sub-frequency band not allocated to a second wireless communication terminal 500, the corresponding subcarrier is referred to as an additional subcarrier. Specifically, the plurality of second wireless communication terminals 500 that is allocated a sub-frequency band adjacent to a frequency band through which an additional subcarrier is transmitted may transmit an additional sub-frequency band at the same time. At this time, each of the plurality of second wireless communication terminals 500 may scale the magnitude of a signal for transmitting an additional subcarrier based on the number of the plurality of second wireless communication terminals 500. For example, each of the first and second stations may transmit an additional subcarrier with ½ of the signal magnitude required for additional subcarrier transmission. At this time, the additional subcarrier corresponds to a sub-frequency band not allocated to a second wireless communication terminal, and the sub-frequency band allocated to each of the first and second stations is adjacent to a sub-frequency band that an additional subcarrier corresponds.

In another specific embodiment, any one second wireless communication terminal 500 may transmit an additional subcarrier. At this time, the plurality of second wireless communication terminals 500 may be a second wireless communication terminal 500 that is allocated a sub-frequency band adjacent to the sub-frequency band where an additional subcarrier is located.

At this time, the first wireless communication terminal 400 may transmit information signaling the second wireless communication terminal 500 that is to transmit an additional subcarrier. Specifically, the HE-SIG-B field described above may include information signaling the second wireless communication terminal 500 that is to transmit an additional subcarrier. The second wireless communication terminal 500 may obtain information signaling the second wireless communication terminal 500 that is to transmit an additional subcarrier and may transmit an additional subcarrier based on information signaling the second wireless communication terminal 500 that is to transmit the additional subcarrier.

In another specific embodiment, the first wireless communication terminal 400 may transmit information signaling a method of transmitting an additional subcarrier. At this time, the information signaling the method of transmitting the additional subcarrier may indicate which one of the second wireless communication terminals 500 is to transmit an additional subcarrier or whether the plurality of second wireless communication terminals 500 transmit an additional subcarrier. Further, the information signaling the method of transmitting the additional subcarrier may indicate the second wireless communication terminal 500 that is to transmit an additional subcarrier. In addition, the information signaling the method of transmitting the additional subcarrier is applied when an additional subcarrier is transmitted to indicate a scaling value for adjusting the magnitude of a signal including the additional subcarrier.

The plurality of second wireless communication terminals 500 may transmit the training signals in a uniform magnitude to the first wireless communication terminal 400. To this end, when transmitting a subcarrier of the training signal corresponding to the sub-frequency band allocated to the second wireless communication terminal 500, the second wireless communication terminal 500 may apply a training signal scaling value for adjusting the magnitude of the training signal in a band allocated to the second wireless communication terminal. At this time, the second wireless communication terminal 500 may determine the training signal scaling value based on the number of subcarriers of the training signal corresponding to the sub-frequency band allocated to the second wireless communication terminal 500. Specifically, the second wireless communication terminal 500 may determine the training signal scaling value based on the number of entire subcarriers of the sub-frequency band allocated to the second wireless communication terminal 500 and the number of subcarriers of the training signal corresponding to the sub-frequency band allocated to the second wireless communication terminal 500. The number of entire subcarriers corresponding to the sub-frequency band allocated to the second wireless communication terminal 500 may indicate the number of subcarriers used for transmitting data through the sub-frequency band allocated to the second wireless communication terminal 500. At this time, subcarriers used for transmitting data may include subcarriers for transmitting data and also subcarriers for transmitting pilot signals. For example, the second wireless communication terminal 500 may determine the training signal scaling value based on a value divided by the number of subcarriers of the training signal corresponding to the sub-frequency band allocated to the second wireless communication terminal 500 and the number of entire subcarriers of the sub-frequency band allocated to the second wireless communication terminal. In a specific embodiment, the second wireless communication terminal 500 may determine the training signal scaling value in inverse proportion to the number of subcarriers of the training signal corresponding to the sub-frequency band allocated to the second wireless communication terminal 500.

Also, the second wireless communication terminal 500 may determine the transmission power of the training signal based on the signal decrease that varies depending on the relative position between the second wireless communication terminal 500 and the first wireless communication terminal 400. Accordingly, the second wireless communication terminal 500 may determine the scaling value based on the signal decrease that varies depending on the relative position between the second wireless communication terminal 500 and the first wireless communication terminal 400. At this time, the relative position between the second wireless communication terminal 500 and the first wireless communication terminal 400 may be the distance between the second wireless communication terminal 500 and the first wireless communication terminal 400.

The first wireless communication terminal 400 receives the data from the plurality of second wireless communication terminals 500 based on the training signal.

The training signal transmitted by the second wireless communication terminal 500 may be the short training signal described above. In another embodiment, the training signal may be the long training signal described above.

In addition, the pattern of the training signal transmitted by the second wireless communication terminal 500 may be any of the training signal patterns described with reference to FIGS. 7 to 10.

In addition, as described with reference to FIG. 11, the second wireless communication terminal 500 may align the durations of the OFDM symbol of the training signal transmitted from the second wireless communication terminal 500 to the first wireless communication terminal 400 and the OFDM symbol of the training signal transmitted from another second wireless communication terminal 500 to the first wireless communication terminal 400. Specifically, the second wireless communication terminal 500 may start the long training signal transmission to the first wireless communication terminal 400 at the same time as another second wireless communication terminal 500, and stop the long training signal transmission to the first wireless communication terminal at the same time as the other second wireless communication terminal 500.

Although some specific embodiments of the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal comprising:
a transceiver; and
a processor,
wherein the processor is configured to, in uplink (UL) orthogonal frequency division multiple access (OFDMA) transmission:
transmit, by using the transceiver, a first one or more fields through a frequency band to a base wireless communication terminal, wherein a preamble of a physical frame includes the first one or more fields to be transmitted in a unit of 20 MHz through the frequency band and a second one or more fields to be transmitted through a sub-frequency band of the frequency band,
adjust a magnitude of a training signal corresponding to the sub-frequency band based on a number of subcarriers of the training signal corresponding to the sub-frequency band, wherein a plurality of training signals configured to be transmitted through an entire frequency band allocated for the UL OFDMA transmission include the training signal corresponding to the sub-frequency band and a training signal corresponding to a sub-frequency band which is not allocated to any wireless communication terminal,
transmit, by using the transceiver, the second one or more fields through the sub-frequency band to the base wireless communication terminal, wherein the second one or more fields include a field including the training signal corresponding to the sub-frequency band and not including the training signal corresponding to the sub-frequency band which is not allocated to any wireless communication terminal, and
transmit data through the sub-frequency band to the base wireless communication terminal,
wherein the training signal corresponding to the sub-frequency band is configured to be used, by the base wireless communication terminal, for automatic gain control for receiving the data from the wireless communication terminal
wherein the training signal corresponding to the sub-frequency band which is not allocated to any wireless communication terminal is not transmitted by any wireless communication terminal in the UL OFDMA transmission.

2. The wireless communication terminal of claim 1, wherein the processor is configured to adjust the magnitude of the training signal corresponding to the sub-frequency band further based on the number of subcarriers which are used for data transmission through the sub-frequency band.

3. The wireless communication terminal of claim 2, wherein the subcarriers which are used for the data transmission comprises a subcarrier for transmitting data and a subcarrier for transmitting a pilot signal.

4. An operating method of a wireless communication terminal in uplink (UL) orthogonal frequency division multiple access (OFDMA) transmission, the method comprising:
transmitting, to a base wireless communication terminal, a first one or more fields through a frequency band to a base wireless communication terminal, wherein a preamble of a physical frame includes the first one or more fields to be transmitted in a unit of 20 MHz through the frequency band and a second one or more fields to be transmitted through a sub-frequency band of the frequency band;

adjusting a magnitude of a training signal corresponding to the sub-frequency band based on a number of subcarriers of the training signal corresponding to the sub-frequency band, wherein a plurality of training signals configured to be transmitted through an entire frequency band allocated for the UL OFDMA transmission include the training signal corresponding to the sub-frequency band and a training signal corresponding to a sub-frequency band which is not allocated to any wireless communication terminal;

transmitting, to the base wireless communication terminal, the second one or more fields through the sub-frequency band, wherein the second one or more fields include a field including the training signal corresponding to the sub-frequency band and not including the training signal corresponding to the sub-frequency band which is not allocated to any wireless communication terminal; and transmitting, to the base wireless communication terminal, the data through the sub-frequency band allocated from the base wireless communication terminal, and wherein the training signal corresponding to the sub-frequency band is configured to be used, by the base wireless communication terminal, for automatic gain control for receiving the data from the wireless communication terminal, wherein the training signal corresponding to the sub-frequency band which is not allocated to any wireless communication terminal is not transmitted by any wireless communication terminal in the UL OFDMA transmission.

5. The method of claim 4, wherein the adjusting the magnitude of the training signal corresponding to the sub-frequency band comprises adjusting the magnitude of the training signal corresponding to the sub-frequency band further based on the number of subcarriers which are used for data transmission through the sub-frequency band.

6. The method of claim 5, wherein the subcarriers which are used for the data transmission comprises a subcarrier for transmitting data and a subcarrier for transmitting a pilot signal.

* * * * *